(12) United States Patent
Babaz (10) Patent No.: US 9,828,003 B2
(45) Date of Patent: Nov. 28, 2017

(54) AERIAL CABLEWAY TRANSPORT INSTALLATION AND METHOD

(71) Applicant: POMA, Voreppe (FR)

(72) Inventor: Mathieu Babaz, Saint-Egrève (FR)

(73) Assignee: POMA, Voreppe (FR)

( * ) Notice: Subject to any disclaimer, the term of this patent is extended or adjusted under 35 U.S.C. 154(b) by 119 days.

(21) Appl. No.: 14/842,362

(22) Filed: Sep. 1, 2015

(65) Prior Publication Data

US 2016/0059867 A1 Mar. 3, 2016

(30) Foreign Application Priority Data

Sep. 1, 2014 (FR) ...................... 14 58167

(51) Int. Cl.
*B61B 7/00* (2006.01)
*B61B 7/04* (2006.01)
*B61B 12/06* (2006.01)

(52) U.S. Cl.
CPC .............. *B61B 7/04* (2013.01); *B61B 12/06* (2013.01); *Y02T 30/30* (2013.01)

(58) Field of Classification Search
CPC .. B61B 7/00; B61B 7/04; B61B 12/00; B61B 12/002
See application file for complete search history.

(56) References Cited

U.S. PATENT DOCUMENTS

| | | | | |
|---|---|---|---|---|
| 4,995,319 A * | 2/1991 | Mugnier | ................. | B61B 12/02 104/112 |
| 6,363,858 B1 * | 4/2002 | Voirin | .................... | A63G 21/22 104/112 |
| 6,393,995 B1 * | 5/2002 | Mugnier | .................. | B61B 7/04 104/112 |
| 7,743,711 B2 * | 6/2010 | Mugnier | ................. | B61B 5/025 104/168 |
| 8,736,459 B2 * | 5/2014 | Ouellet | ................ | A63B 69/187 104/112 |
| 2004/0003751 A1 * | 1/2004 | Albrich | ................. | B61B 12/002 104/27 |

(Continued)

FOREIGN PATENT DOCUMENTS

CA    2 645 389 A1    1/2010
EP    1 837 264 A2    9/2007

(Continued)

OTHER PUBLICATIONS

Jul. 27, 2017 Office Action issued in Colombian Patent Application No. 15204307.

*Primary Examiner* — Jason C Smith
(74) *Attorney, Agent, or Firm* — Oliff PLC (57) ABSTRACT

An aerial cableway transport installation, comprising:
two vehicles each equipped with a detachable clamp to detach the vehicle from and couple the vehicle to the aerial cableway;
one coupling device of the vehicles to the aerial cableway;
one flexing pillar of the aerial cableway;
detection means of a first vehicle coupled to the aerial cableway passing over said pillar, the detection means being configured to transmit at least one coupling signal when passing is detected; and
control means of said coupling device connected to the detection means and configured to command coupling of at least a second vehicle to the aerial cableway on receipt of said coupling signal.

16 Claims, 5 Drawing Sheets

(56) References Cited

U.S. PATENT DOCUMENTS

| | | | |
|---|---|---|---|
| 2007/0221088 A1 | 9/2007 | Hinteregger | |
| 2011/0259235 A1* | 10/2011 | Blandon | B61B 12/06 104/112 |
| 2012/0103225 A1* | 5/2012 | Gubler | B61B 12/002 104/112 |
| 2013/0098260 A1 | 4/2013 | Creissels et al. | |
| 2013/0289806 A1* | 10/2013 | Fourgeaud | B61B 12/06 701/19 |
| 2016/0059867 A1* | 3/2016 | Babaz | B61B 12/06 104/112 |

FOREIGN PATENT DOCUMENTS

| | | |
|---|---|---|
| EP | 2 101 237 A2 | 9/2009 |
| FR | 2 969 566 A1 | 6/2012 |
| JP | H04-11551 A | 1/1992 |
| JP | 2011-207280 A | 10/2011 |

* cited by examiner

AERIAL CABLEWAY TRANSPORT INSTALLATION AND METHOD

BACKGROUND OF THE INVENTION

The invention relates to transport by aerial cableway, in particular transport of persons, in particular cable cars.

STATE OF THE ART

Different types of transport installation by cableway exist at the present time. For example installations which use a hauling rope located at ground level, such as funicular railways. Other installations use one or more aerial hauling ropes, such as cable cars which are transport installations to move one or more passenger vehicles, also called cabins, cars, chairs, etc. Certain cable cars are said to be detachable, i.e. the vehicles designed to be coupled to the aerial hauling rope are provided with a detachable clamp which enables them to be detached from the rope, in particular when they enter a terminal of the installation. Furthermore, these cable cars being designed to transport passengers, it is advantageous to provide means for improving the comfort of the passengers during their transport. In particular, when the vehicles pass a pillar, jerking may occur due in particular to the change of direction of the rope which modifies the tension exerted on the latter and may cause discomfort for the passengers. In addition, these installations are electric power consumers and a requirement exists to provide means for economising the electric power consumed by such installations.

OBJECT OF THE INVENTION

One object of the invention consists in providing means for improving the comfort of the passengers of the vehicles during their transport.

Another object of the invention is to reduce the power consumption of a transport installation by cableway.

According to one feature of the invention, a transport installation by aerial cableway is proposed, comprising:
  at least two vehicles each provided with a detachable clamp to detach the vehicle from and couple the vehicle to the aerial cableway;
  at least one coupling device of the vehicles to the aerial cableway; and
  at least one flexing pillar of the aerial cableway.
The installation further comprises:
  detection means for detecting passing of a first vehicle coupled to the aerial cableway over said pillar, the detection means being configured to transmit at least one coupling signal when passing is detected; and
  control means of said coupling device connected to the detection means and configured to command coupling of at least a second vehicle to the aerial cableway on receipt of said coupling signal.

Jerking generated on the rope which occurs when a vehicle on the line passes over a flexing pillar of the aerial cableway is thus reduced. The flexing pillar of the aerial cableway can be a support pillar to flex the rope in a descending direction, or a compression pillar to flex the rope in an ascending direction, or on the other hand a support-compression pillar which acts as a support pillar or a compression pillar. When a vehicle passes over a pillar, the global tension generated on the rope does in fact vary which causes a jerk on the rope. In order to reduce jerking, one or more other vehicles are coupled to the aerial cableway to counteract the variation of the global tension on the rope, either by increasing the tension when the latter tends to decrease, or the opposite. By coupling at least one vehicle in a terminal when another vehicle coupled to the rope passes over a pillar, the torque provided by the drive motor is smoothed in order to limit jerking and reduce the power consumed by the motor. Jerking of the motor can thus be reduced for different configurations of the transport installations, in particular those which have a single support pillar or a single compression pillar. Advantageously the necessary power of the drive motor is reduced. It is thus possible to envisage using a single drive motor having smaller dimensions. According to another advantage, the braking force of the rope is reduced and less powerful brakes can be used for the drive motor and for the bull-wheel. According to another advantage, the necessary power of the drive motor is reduced and it can be envisaged to use a weaker motor shaft inertia.

The detection means can comprise a position sensor configured to detect passing of said pillar by the first vehicle coupled to the aerial cableway, and to transmit a coupling signal to the control means when passing of said pillar is detected.

The detection means can further comprise a computation unit configured to calculate a time when the first vehicle will pass over said pillar and to transmit a coupling signal to the control means when the calculated time is reached.

The installation can comprise a drive motor of the aerial cableway, and the detection means can comprise a module to determine a torque supplied by the drive motor and to transmit a coupling signal to the control means when an absolute value of the rate of the variation of the torque supplied by the drive motor is higher than a set threshold.

In particular, when a vehicle is hauled from a downhill point to an uphill point, when the vehicle passes over a support pillar, it is then hauled from an uphill point to a downhill point, and the vehicle enhances driving of the rope, which leads to jerking of the motor. When the vehicle passes over the support pillar, the rate of variation of the torque becomes higher than a set threshold, and another vehicle is coupled to increase the motor torque again, thereby smoothing the torque supplied by the drive motor of the rope. By means of controlled coupling of the vehicles in the terminal, the motor torque supplied by the motor can be smoothed, which improves passenger comfort and reduces the power consumption of the bull-wheel drive motor. What is meant by rate of variation is the absolute value of the variation, either increasing or decreasing, of the motor torque supplied by the drive motor divided by a duration.

The module can comprise means for measuring a current consumed by the drive motor and determines the torque supplied by the drive motor from the measured consumed current.

Said pillar can be a support pillar to flex the aerial cableway in a descending direction and the detection means can transmit the coupling signal to the control means when a rate of decrease of the torque supplied by the drive motor is higher than the set threshold.

The installation can comprise at least one compression pillar to flex the rope in an ascending direction, and the detection means transmit the coupling signal to the control means when a rate of increase of the torque supplied by the drive motor is higher than the set threshold.

When the installation comprises a compression pillar, a vehicle is hauled from an uphill point to a downhill point, then, when the vehicle passes the compression pillar, it is then hauled from a downhill point to an uphill point, and the vehicle slows down driving of the rope, which leads to jerking of the motor. When the vehicle passes the pillar, the torque increases and in particular the rate of increase of the torque is higher than the set threshold, and another vehicle is coupled to reduce the motor torque again and to smooth the torque supplied by the drive motor of the rope.

For the case of a support-compression pillar, the case of a support pillar relates if the vehicle is hauled from the downhill to uphill before passing over the pillar, and then from uphill to downhill after this passage. The case of a compression pillar relates if the vehicle is hauled from uphill to downhill before passing over the pillar, and then from downhill to uphill after this passage.

The control means can command said coupling device to couple the vehicles with a variable coupling frequency.

Such an installation is particularly suitable for coupling the vehicles according to requirements, and more particularly when the rates of variation of the torque supplied by the motor exceed the set threshold at a variable frequency.

The installation can comprise at least two stations each equipped with a coupling device of the vehicles to the aerial cableway, and the control means command the coupling device of a terminal to couple the vehicles to the aerial cableway with a different coupling frequency from that of the coupling device of at least one other station.

The jerking generated on the rope is thus mastered by synchronizing the coupling rhythm of the vehicles with passage over the pillars, which is not the case of installations which have an identical running rhythm between the different terminals and do not enable the jerking generated on the rope to be reduced.

According to another feature of the invention, a method is proposed for transport by aerial cableway of at least two vehicles each equipped with a detachable clamp to be detached from and coupled to the aerial cableway, the aerial cableway being flexed by at least one pillar.

The method comprises the following steps:
  detecting passing of a first vehicle coupled to the aerial cableway over said pillar; and
  coupling at least a second vehicle to the aerial cableway when the passing is detected.

The detection step can comprise calculation of a time when the first vehicle will pass over said pillar, and the coupling step comprises coupling of at least a second vehicle to the aerial cableway when the calculated time is reached.

The aerial cableway can be driven by a motor, the detection step comprises determination of a torque supplied by the motor and the coupling step comprises coupling of at least a second vehicle to the aerial cableway when an absolute value of the rate of variation of the torque supplied by the motor is higher than a set threshold.

The aerial cableway can be flexed in a descending direction by at least one support pillar, and the coupling step can comprise coupling of at least a second vehicle to the aerial cableway when a rate of decrease of the torque supplied by the motor is higher than the set threshold.

The aerial cableway can be flexed in an ascending direction by at least one compression pillar, and the coupling step comprises coupling of at least a second vehicle to the aerial cableway when a rate of increase of the torque supplied by the motor is higher than the set threshold.

The coupling step can also comprise coupling of the vehicles with a variable coupling frequency.

The method can comprise at least two stations configured to couple the vehicles to the aerial cableway, and the coupling step can comprise coupling of the vehicles in at least one station with a different coupling frequency from that of at least one other station.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
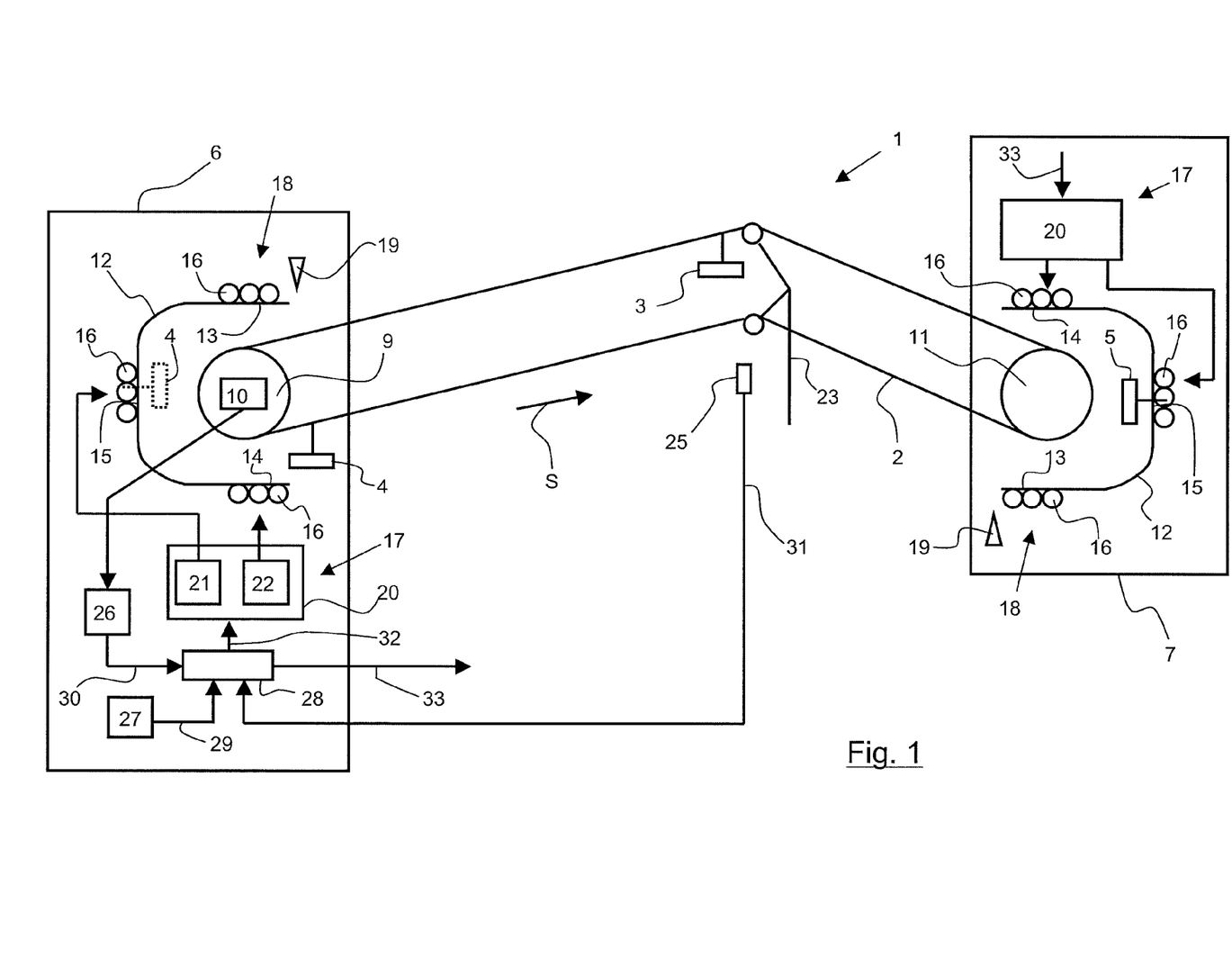
FIG. 1 schematically illustrates an embodiment of a transport installation by cableway according to the invention.
Figure 3:
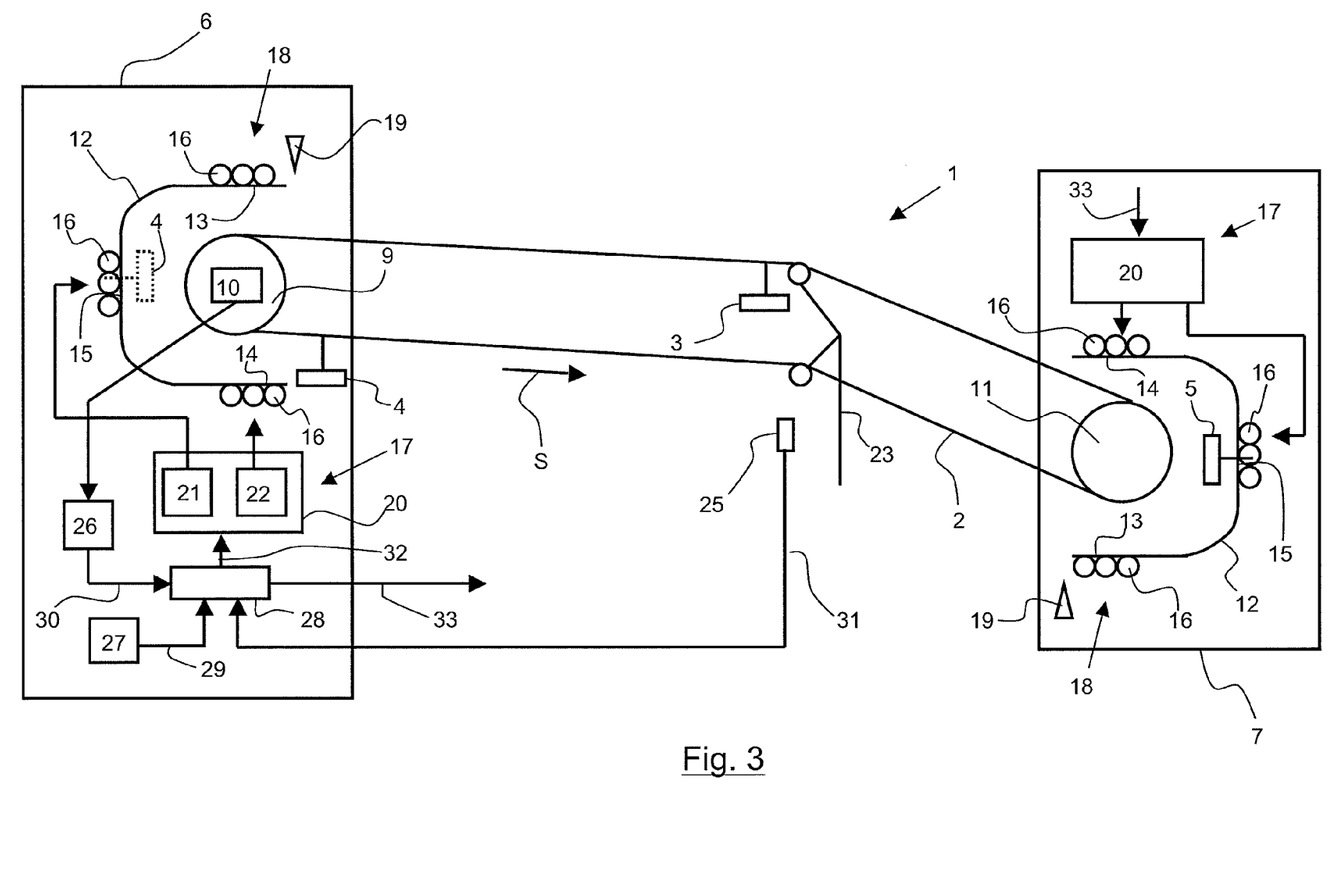
FIGS. 3 to 5 schematically illustrate other embodiments of a transport installation by cableway.
Figure 4:
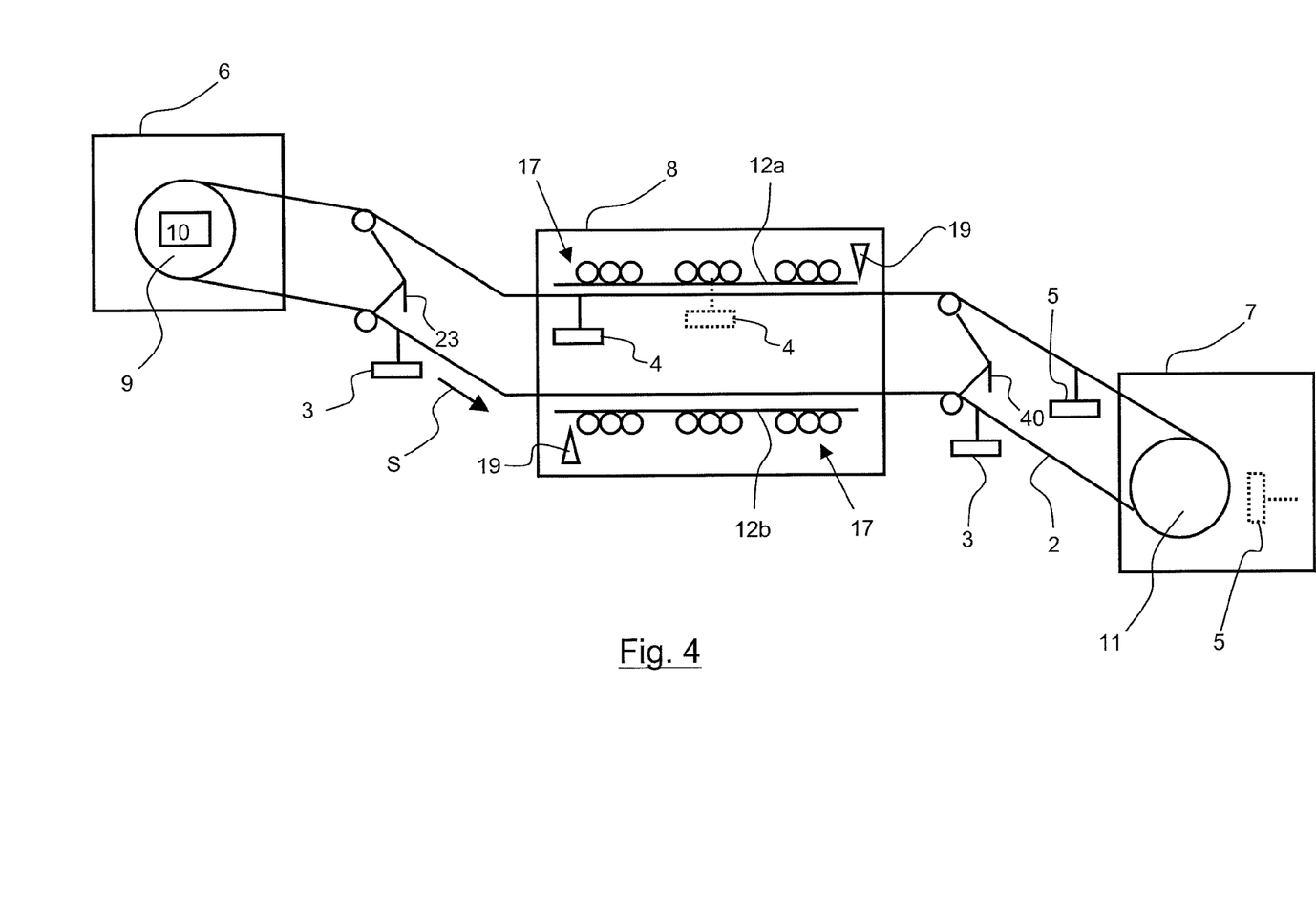

In FIG. 1, a transport installation 1 by aerial cableway 2 comprising at least two vehicles 3 to 5 has been represented. In the example illustrated in FIG. 1, the installation comprises three vehicles 3 to 5. Vehicles 3 to 5 are configured to be coupled to the rope 2 and hauled by the latter. The transport installation 1 is in general manner a cable car. More particularly, the installation 1 can be a cabin lift and in this case the vehicles are closed, or it can be a chair lift where the vehicles are open. The installation 1 comprises at least two terminal stations, called terminals 6, 7, for loading and unloading of people. In the examples illustrated in FIGS. 1 and 5, the installation 1 comprises two terminals 6, 7 situated at the same level, i.e. on the same horizontal line. As a variant, a first terminal 6 is located uphill and is called uphill terminal, and a second terminal 7 is located downhill and is called downhill terminal, as illustrated in FIGS. 3 and 4. The transport installation 1 can further comprise one or more intermediate stations 8, located between two terminals 6, 7, as illustrated in FIG. 4. In general manner, the transport installation 1 is said to be detachable, i.e. the vehicles 3 to 5 each comprise a detachable clamp to be able to couple and detach the vehicle 3 to 5 to and from the aerial cableway 2. The installation 1 can further comprise other ropes, called carrier ropes, to suspend the vehicles 3 to 5 above the ground. The installation 1 can also comprise other hauling ropes when the vehicles are large and heavy. These different ropes have not been represented in the figures for the sake of simplification. In any case, the installation 1 comprises at least one hauling rope 2, which may be a carrier rope or not, to move the vehicles 3 to 5 by traction from one terminal 6 to the other 7, 8, and vice-versa. The hauling rope 2 is a continuous rope in a closed loop, driven by a bull-wheel 9 itself driven by a motor 10 of one of the terminals 6, also called drive terminal 6. The other terminal 7 for its part comprises a non-motorized bull-wheel 11, called return bull-wheel, to place the hauling rope 2 under tension between the terminals 6, 7.

Furthermore, when a vehicle 3 to 5 leaves a station 6 to 8, it is coupled to the rope 2 which conveys it to another station, either an end terminal 6, 7 or an intermediate station 8. In this case, the detachable clamp is closed and the vehicle is secured to the rope 2, i.e. it is permanently mechanically connected on the rope 2. Between two stations, the vehicles run along a running track defined by the hauling rope 2, the vehicles are also said to be on-line. When a vehicle 3 to 5 reaches a station 6 to 8, the clamp of the vehicle opens and the vehicle 3 to 5 is detached from the hauling rope 2. The detached vehicle can be stopped, or can run on a transfer circuit 12 of a station 6 to 8 at a slower speed than that of the hauling rope 2. Each transfer circuit 12 comprises a deceleration section 13, an acceleration section 14 and an intermediate section 15 which connects the first two sections 13, 14. More particularly, each terminal 6, 7 comprises a single transfer circuit 12, and the intermediate stations 8 can comprise two transfer circuits 12a, 12b.

Each section 13 to 15 comprises a set of wheels 16 with pneumatic tires arranged along the section 13 to 15. The wheels 16 collaborate by friction with friction plates fixed to the clamps of the vehicles 3 to 5 to move the detached vehicles in the transfer circuit 12 of each of the stations 6 to 8.

Each station 6 to 8 comprises a coupling device 17 to couple a vehicle to the aerial cableway 2 and a detachment device 18 to detach a vehicle. The detachment device 18 comprises the deceleration section 13, and a clamp opening mechanism 19 to open the clamp of the vehicle entering the station, which detaches it from the rope 2. The opening mechanism 19 is situated at the beginning of the deceleration section 13, i.e. at the place where the vehicles enter the station. The opening mechanism 19 comprises a rail to enable a spring of the clamp to be compressed so as to open it and to keep the clamp open during running of the vehicle in the transfer circuit 12, 12a, 12b. Then the vehicle reaches the intermediate section 15 in which it is stopped, or may be moved at low speed, a lower speed than that at which it was moving in the deceleration section 13.

Furthermore, each coupling device 17 comprises the intermediate section 15, the acceleration section 14, and a launching device 20. The launching device 20 comprises a starter drive motor 21 and an acceleration motor 22. The starter drive motor 21 drives the set of wheels 16 of the intermediate section 15 to move the detached vehicles from the intermediate section 15 to the acceleration section 14. For example, the starter drive motor 21 drives a drive belt of the wheels 16 of the intermediate section 15. As a variant, the starter drive motor 21 drives a studded chain to press against the vehicles and push them from one location to the other. The acceleration motor 22 for its part enables the detached vehicles to be accelerated along the acceleration section 14 to a speed equal to that of the hauling rope 2 in order to attach the vehicle without jerking. For example, the acceleration motor 22 drives the wheels 16 of the acceleration section 14 by means of a belt to accelerate the detached vehicles. When the vehicles leave the acceleration section 14, the clamp exits from the rail and the spring compresses again to close the clamp on the hauling rope 2, thereby coupling the vehicle to the rope 2. The starter drive and acceleration motors 21, 22 can be variable-speed or constant-speed motors. Preferably, the motors 21, 22 are constant-speed motors.

Figure 5:
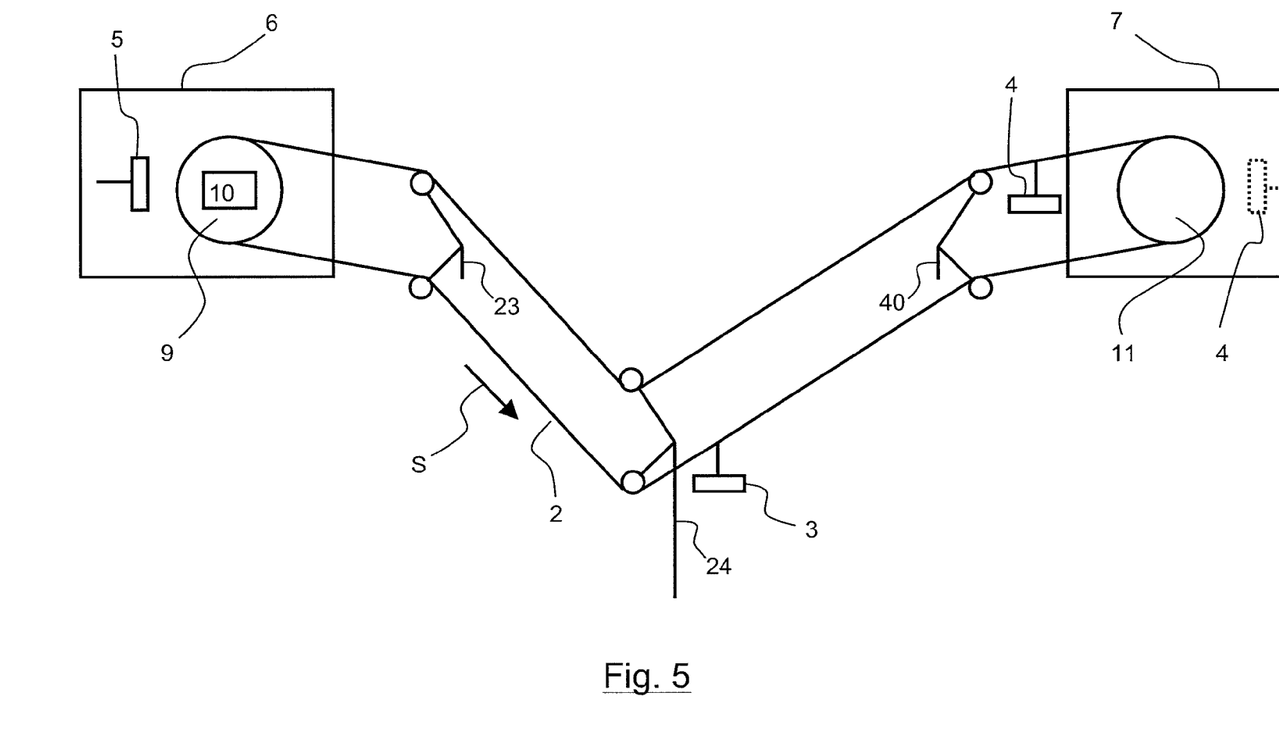

The installation 1 also comprises at least one support pillar 23 of the aerial cableway 2. In other words, the support pillars 23 flex the aerial cableway 2 in the direction of the ground, for example so that the aerial cableway 2 follows the contours of the ground. This means that the support pillars 23 flex the aerial cableway 2 in a descending direction. In general, the support pillars 23 are located between two terminals 6 to 8. The installation 1 can further comprise at least one compression pillar 24 to flex the rope 2 in an ascending direction, as illustrated in FIG. 5. As a variant, the installation 1 can comprise one or more support-compression pillars.

The installation 1 can further comprise detection means 25 to 27 of passing of a pillar, a support pillar 23 and/or compression pillar 24, and/or support-compression pillar (not represented for the sake of simplification), by a vehicle coupled to the aerial cableway 2, and control means 28 configured to control the coupling devices 17 of the terminals 6 to 8.

The detection means 25 to 27 are configured to transmit at least one coupling signal to the control means 28 by means of connections 29 to 31, which can be hardwired or not, for example radiofrequency waves. A coupling signal is transmitted by the detection means 25, 26 when passing of a pillar 23, 24 of the installation 1 by a vehicle coupled to the aerial cableway 2 is detected. For example, the detection means comprise a position sensor 25 configured to detect passing of a pillar 23, 24 by a vehicle coupled to the aerial cableway 2. The position sensor 25 transmits a coupling signal to the control means 28, via the connection 31, when passing of the pillar is detected. Preferably, each pillar 23, 24 of the installation is equipped with a position sensor 25. The position sensors 25 are for example fixed onto their respective pillars 23, 24. According to a variant, the detection means comprise a module 26 configured to determine a torque supplied by the drive motor 10. Furthermore, the module 26 transmits a coupling signal to the control means 28 via the connection 30 when an absolute value of the rate of variation of the torque supplied by the drive motor 10 is higher than a set threshold. The set threshold depends on the configuration of the installation 1. For example, the set threshold is higher than the rates of variation of the motor torque when one or more vehicles are hauled between a station and a pillar, or between two pillars, and in an ascending or descending direction. Detection of a rate of variation of the torque supplied by the drive motor 10, when it is higher than the set threshold, corresponds to a vehicle passing a pillar. When a vehicle passes a support pillar 23, the vehicle will in fact it go from an uphill point (the top of the pillar) to a downhill point (a position situated after the pillar in the direction of hauling of the rope 2), which provides energy to the drive motor 10 as the vehicle enhances driving of the rope. More particularly, before passing the support pillar 23, the drive motor increases the supplied torque with a rate of variation lower than the set threshold, in order to move the vehicle from a downhill point to the top of the support pillar 23. Then, when the vehicle passes over the pillar, the torque decreases, and after the vehicle has passed, the torque further decreases so that the rate of decrease of the supplied torque is higher than the set threshold. In any case, the motor torque decreases when a support pillar 23 is passed in the case where the vehicle coupled to the rope is moving away from or towards the drive terminal 6. Thus, when passing of a support pillar 23 is detected, a vehicle is coupled which will be hauled in the direction of the support pillar 23 and which will slow down driving of the rope, which limits jerking and reduces the power consumption of the motor 10.

Furthermore, when a vehicle passes over a compression pillar 24, the vehicle will go from a downhill point (the top of the pillar) to an uphill point (a position located after the pillar in the hauling direction of the rope 2), and the drive motor 10 has to increase the supplied torque to move the vehicle up to the uphill point, as the vehicle slows down driving of the rope. More particularly, before passing the compression pillar 24, the torque supplied by the motor 10 increases with a rate of variation lower than the set threshold in order to move the vehicle from an uphill point to the compression pillar 24. Then, when the vehicle passes over the pillar 24, the torque increases and, after the vehicle has passed, the torque increases again so that the rate of increase of the supplied torque is higher than the set threshold. In any case, the motor torque increases when a compression pillar 24 is passed in the case where the vehicle coupled to the rope is moving away from or towards the drive terminal 6.

In order to determine the rates of variation of the motor torque, the module 26 can determine the power consumed by the motor, or the speed of the rope, or the current consumed by the motor 10. In particular, the current consumed by the motor 10 is the image of the supplied torque. Preferably, the module 26 comprises means for measuring the current consumed by the drive motor 10 and determines the torque supplied by the drive motor 10 from the measured consumed current.

According to yet another variant, the detection means comprise a computation unit 27 configured to calculate a time when a vehicle will pass over a pillar 23, 24. Furthermore, the computation unit 27 transmits a coupling signal to the control means 28, via the connection 29, when the calculated time is reached. For example, the computation unit 27 comprises position sensors located on the coupling devices 17 to detect coupling of a vehicle to the aerial cableway 2. The computation unit 27 further measures a passage time when a vehicle is coupled to the aerial cableway 2, measures the speed of rotation of the bull-wheel in the course of time, and then calculates the time when the coupled vehicle will pass over a pillar from the measured speed and passage time, and from the distances between the pillars and the coupling devices 17. The distances are data recorded beforehand in a non-volatile memory of the computation unit 27.

The detection means 25 to 27 can comprise position sensors 25, a module 26 and a computation unit 27 in combination.

The control means 28 are connected to the detection means, by the connections 29 to 31, and are configured to command coupling of a vehicle to the aerial cableway 2 on receipt of at least one coupling signal provided either by a position sensor 25, or by the module 26, or by the computation unit 27, or all three. The redundancy of the coupling signals enables a failure of the sensor 25 or of the module 26 or of the computation unit 27 to be palliated. For example the control means 28 can be configured to trigger coupling if they receive at least one coupling signal. Preferably, the control means 28 are configured to trigger coupling if they receive at least the coupling signal coming from the computation unit 27. The control means 28 can be an electronic control unit. In general manner, the control means 28 command a coupling device when a vehicle passes over a pillar, in other words when the control means 28 receive a coupling signal coming from the module 26, or from a position sensor 25, or from the computation unit 27, or from all three at the same time. The control means 28 are connected to the coupling devices 17 of the stations by connections 32, which can be hardwired or not, for example by radiofrequency waves. More particularly, the control means 28 command the starter drive motor 21 and acceleration motor 22. When the control means 28 receive a coupling signal, they command a coupling device 17 of at least one station 6 to 8 to couple a detached vehicle to the aerial cableway 2. Furthermore, the control means 28 command the starter drive motor 21 to move a detached vehicle from the intermediate section 15 to the acceleration section 14. Then the acceleration motor 22, which can drive the wheels 16 of the acceleration section in permanent manner, accelerates the vehicle to couple it to the rope 2.

The general operating principle of the installation 1 is to detect passing of a first vehicle coupled to the rope over a pillar, and to couple at least a second vehicle to the aerial cableway when passing of the first vehicle over the pillar is detected. In FIG. 1, in an initial state, the first vehicle 3 passes over the support pillar 23, the second vehicle 4 is coupled to the rope 2, and the third vehicle 5 is at a standstill in the end terminal 7. When the second vehicle 4 is coupled to the aerial cableway 2, it leaves its standstill position in the intermediate section 15, represented in broken lines, moves into the acceleration section 14 and is then coupled to the rope 2. Then the aerial cableway 2 is driven in the direction S towards another terminal 7. In this case, the first vehicle 3 is hauled in the direction of the drive terminal 6, and descends from the top of the support pillar 23 to the drive terminal 6. The second vehicle 4 is hauled in the direction of the top of the support pillar 23. Then the first vehicle 3 is detached and stops in the intermediate section 15 of the drive terminal 6, and the second vehicle 4 passes over the support pillar 23 in the direction of the other terminal 7. The detection means 25 to 27 transmit a coupling signal to the control means 28 indicating that the second vehicle 4 has passed over the support pillar 23, and the control means 28 command the coupling device of the terminal 7 to couple the third vehicle 5 to the aerial cableway 2. At the end of the cycle, the second vehicle 4 enters the terminal 7 where it is detached to be stopped in the intermediate section 15 of the terminal 7. Furthermore, the third vehicle 5 passes over the support pillar 23 in the direction of the drive terminal 6 and a new passage signal is transmitted by the detection means 25, 26, and the control means 28 command the coupling device 17 of the drive terminal 6 to couple the first vehicle 3 to the aerial cableway.

Figure 2:
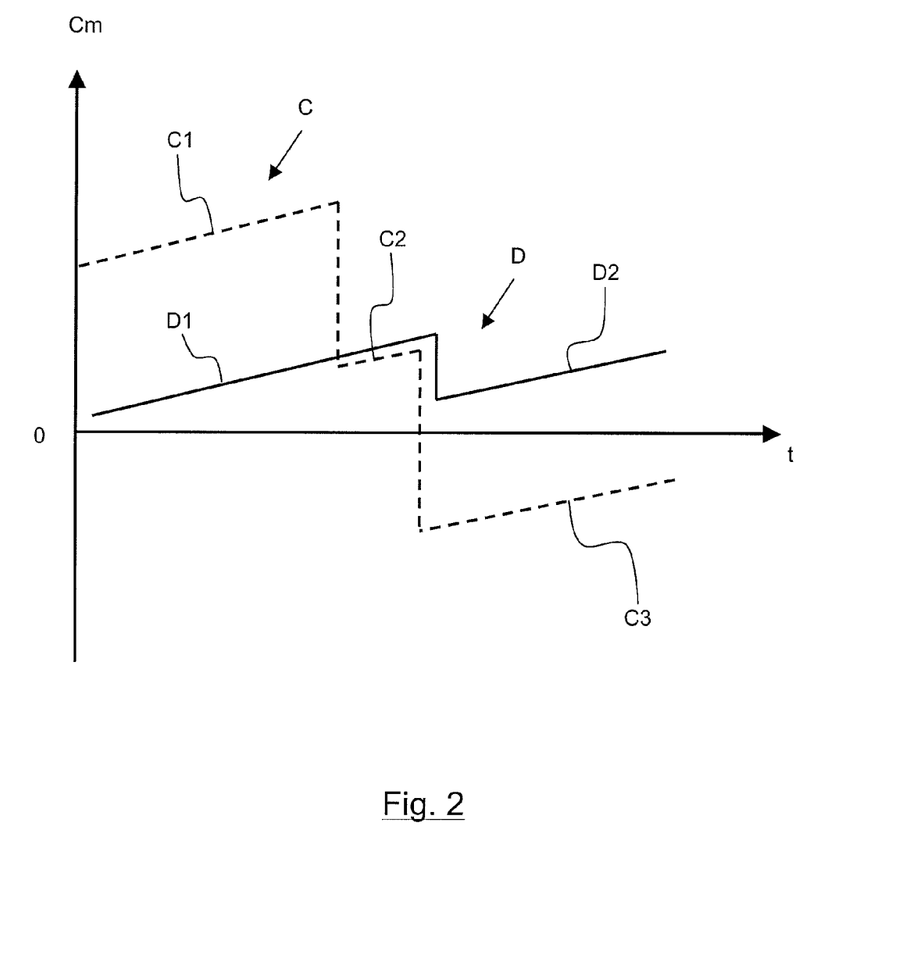
FIG. 2 schematically illustrates plots of the torque supplied by a drive motor of the rope versus time.

In FIG. 2, a first curve C has been represented, in broken line, which corresponds to the torque Cm supplied by the drive motor 10 versus time t, in the case where two vehicles are coupled in the installation 1 described in FIG. 1 in a conventional prior art manner. The conventional prior art manner consists in coupling the vehicles respecting a constant time interval between coupling of two consecutive vehicles in each of the terminals, to keep a constant distance between the vehicles coupled to the rope. In a first step, illustrated by a first part C1 of the first curve C, the two vehicles are coupled at the same time in respectively the two terminals 6, 7. Then the vehicles are hauled at the same time towards the top of the support pillar, and the motor torque increases. In a second step, illustrated by a second part C2 of the first curve C, a first vehicle coupled to the rope passes over the pillar, and the torque decreases sharply causing jerking, then increases again due to the traction of the second vehicle towards the top of the pillar. In a third step, illustrated by a third part C3 of the first curve C, the second vehicle passes over the pillar, the torque again decreases sharply causing jerking, and becomes negative on account of the fact that the two vehicles are descending towards the two terminals 6, 7 respectively, and mutually enhance the driving of the aerial cableway.

On the contrary, according to the invention, the torque supplied by the drive motor is smoothed. A second curve D has been represented, in an unbroken line, corresponding to the torque Cm supplied by the drive motor 10 versus time t, in the case where three vehicles are coupled in the installation 1 described in FIG. 1 according to the invention. According to the invention, the constant time interval between coupling of two consecutive vehicles in each of the terminals is not necessarily respected. Moreover, the invention consists in coupling the vehicles to limit jerking of the drive motor 10. In a first step, illustrated by a first part D1 of the second curve D, a first vehicle coupled to the rope passes over a pillar, and a second vehicle is therefore coupled in a terminal 6. Then the first vehicle is hauled towards the terminal 6 and the second vehicle is hauled in the direction of the top of the pillar, and the motor torque increases. In particular, the rate of variation of the torque is lower than a set threshold. In a second step, illustrated by a second part D2 of the second curve D, the second vehicle coupled to the rope passes over the pillar, and the torque decreases sharply causing a new jerking. In particular, the rate of variation of the torque is higher than the set threshold.

In the second step, the third vehicle is coupled in one of the terminals, preferably the other terminal 7, and the torque then increases to haul the third vehicle towards the top of the pillar. The motor torque can continue to be smoothed by coupling a fourth vehicle when the third vehicle passes over the support pillar. By means of the invention, the torque supplied by the drive motor is smoothed, and jerking is therefore limited.

The transport installations 1 can have different configurations. They can comprise one or more pillars, an even or odd number of vehicles, uphill and downhill terminals, or terminals situated at the same level, and the drive terminal can be uphill or downhill. For example, in order to limit jerking, the coupling device 17 of a station 6 to 8 couples the vehicles with a different coupling frequency from that of the coupling device 17 of at least one other station 6 to 8. In the state of the art, it is in fact desired to keep an identical distance between the vehicles on line, and in this case the frequency of attachment of the detached vehicles has to be identical in each of the terminals. In the state of the art, jerking on the bull-wheel is not mastered, and the motor torque supplied is not mastered either. On the contrary, according to the invention, by coupling the vehicles with a different coupling frequency depending on the terminals, the tension generated on the rope, and thereby the torque supplied by the drive motor, can be adjusted according to requirements, and in particular the vehicles are coupled with a coupling frequency which is determined from the rates of variation of the motor torque.

In FIG. 3, another embodiment of the invention has been represented wherein the drive terminal 6 is located at a higher level than the other terminal 7, and the top of the support pillar 23 is located at a higher level than the drive terminal 6. The reference numerals of the same component parts described previously in FIG. 1 have also been used in FIG. 3. The drive terminal 6 is then an uphill terminal. The coupling principle remains identical to that described in FIG. 1.

In FIG. 4, yet another embodiment of the invention has been represented wherein the installation 1 comprises an uphill drive terminal 6, a downhill terminal 7 and an intermediate station 8 situated between the two end terminals 6, 7. The reference numerals of the same component parts described previously in FIG. 1 have also been used in FIG. 4. Furthermore, the installation 1 comprises a first support pillar 23 located between the uphill terminal 6 and the intermediate station 8, the top of the pillar being located at a higher level than the downhill terminal 6, and a second support pillar 40 located between the intermediate station 8 and the downhill terminal 7, the top of the pillar being located at a higher level than the intermediate station 8. In this embodiment, when a first vehicle 3 passes over the first support pillar 23, a second vehicle 4 is coupled in the intermediate station 8 in the direction of the uphill terminal 6. Then, when the first vehicle 3 passes over the second support pillar 40, a third vehicle 5 is coupled in the downhill terminal 7.

In FIG. 5, yet another embodiment of the invention has been illustrated wherein the installation comprises two terminals 6, 7 located at the same level. The reference numerals of the same component parts described previously in FIG. 1 have also been used in FIG. 5. Furthermore, the installation comprises two support pillars 23, 40 and a third compression pillar 24 located between the first two pillars 23, 40. In this case, when a first vehicle 3 passes over the third pillar, a second vehicle 4 is coupled in the terminal 7, located on the right in FIG. 5. As a variant, a second vehicle could be coupled in the drive terminal 6. According to yet another variant, a second and third vehicle can be coupled simultaneously in respectively the two terminals 6, 7.

Furthermore, a transport method by cableway can be implemented by the transport installation 1 described in the foregoing.

The invention thus described enables passenger comfort to be improved by limiting jerking generated on the aerial cableway of the installation. The invention further enables the energy consumptions of the drive motor of the aerial cableway to be reduced.

The invention claimed is:

1. A transport installation by aerial cableway, comprising:
   at least two vehicles each provided with a detachable clamp to detach the vehicle from and couple the vehicle to the aerial cableway;
   at least one coupling device of the vehicles to the aerial cableway; and
   at least one flexing pillar of the aerial cableway,
   detection means for detecting passing of a first vehicle coupled to the aerial cableway over said pillar, the detection means transmits at least one coupling signal when passing is detected; and
   control means of said coupling device connected to the detection means and that commands coupling of at least a second vehicle to the aerial cableway on receipt of said coupling signal.

2. The installation according to claim 1, wherein the detection means comprise a position sensor configured to detect passing of said pillar by the first vehicle coupled to the aerial cableway, and to transmit a coupling signal to the control means when passing of said pillar is detected.

3. The installation according to claim 1, wherein the detection means comprise a computation unit configured to calculate a time when the first vehicle will pass over said pillar and to transmit a coupling signal to the control means when the calculated time is reached.

4. The installation according to claim 3, comprising at least one compression pillar to flex the aerial cableway in an ascending direction, and wherein the detection means transmit the coupling signal to the control means when a rate of increase of the torque supplied by the drive motor is higher than the set threshold.

5. The installation according to claim 1, comprising a drive motor of the aerial cableway, and wherein the detection means comprise a module to determine a torque supplied by the drive motor and to transmit a coupling signal to the control means when an absolute value of the rate of variation of the torque supplied by the drive motor is higher than a set threshold.

6. The installation according to claim 5, wherein the module comprises means for measuring a current consumed by the drive motor and determines the torque supplied by the drive motor from the measured consumed current.

7. The installation according to claim 5, wherein said pillar is a support pillar to flex the aerial cableway in a descending direction and the detection means transmit the coupling signal to the control means when a rate of decrease of the torque supplied by the drive motor is higher than the set threshold.

8. The installation according to claim 1, wherein the control means command said coupling device to couple the vehicles with a variable coupling frequency.

9. The installation according to claim 1, comprising at least two stations each equipped with a coupling device of the vehicles to the aerial cableway, and wherein the control means command the coupling device of a terminal to couple the vehicles to the aerial cableway with a different coupling frequency from that of the coupling device of at least one other station.

10. A transport method by aerial cableway of at least two vehicles each equipped with a detachable clamp to be detached from and coupled to the aerial cableway, the aerial cableway being flexed by at least one pillar, comprising the following steps:
   detecting passing of a first vehicle coupled to the aerial cableway over said pillar; and
   coupling at least a second vehicle to the aerial cableway when passing is detected.

11. The method according to claim 10, wherein the detection step comprises calculation of a time when the first vehicle will pass over said pillar, and the coupling step comprises coupling of at least a second vehicle to the aerial cableway when the calculated time is reached.

12. The method according to claim 10, wherein the aerial cableway is driven by a motor, the detection step comprises determination of a torque supplied by the motor and the coupling step comprises coupling of at least a second vehicle to the aerial cableway when an absolute value of the rate of variation of the torque supplied by the motor is higher than a set threshold.

13. The method according to claim 12, wherein the aerial cableway is flexed in a descending direction by at least one support pillar, and the coupling step comprises coupling of at least a second vehicle to the aerial cableway when a rate of decrease of the torque supplied by the motor is higher than the set threshold.

14. The method according to claim 12, wherein the aerial cableway is flexed in an ascending direction by at least one compression pillar, and the coupling step comprises coupling of at least a second vehicle to the aerial cableway when a rate of increase of the torque supplied by the motor is higher than the set threshold.

15. The method according to claim 10, wherein the coupling step comprises coupling of the vehicles with a variable coupling frequency.

16. The method according to claim 10, comprising at least two stations configured to couple the vehicles to the aerial cableway, and the coupling step comprises coupling of the vehicles in at least one station with a different coupling frequency from that of at least one other station.

* * * * *